United States Patent [19]

Cwik

[11] Patent Number: 4,482,164
[45] Date of Patent: Nov. 13, 1984

[54] STABLE STRUCTURALLY RIGID, MOBILE CARRIAGE ASSEMBLY AND BASE THEREFOR

[75] Inventor: Norbert L. Cwik, Northfield, Ill.

[73] Assignee: Quaker Industries, Inc., Antioch, Ill.

[21] Appl. No.: 587,847

[22] Filed: Mar. 12, 1984

Related U.S. Application Data

[63] Continuation of Ser. No. 371,948, Apr. 26, 1982, abandoned.

[51] Int. Cl.$^3$ .............................................. B62B 1/10
[52] U.S. Cl. .............................. 280/47.24; 280/47.33
[58] Field of Search ................ 280/47.24, 47.2, 47.17, 280/47.19, 47.33, 47.34, 47.35, 79.1 A, 63; 108/91, 119; 211/193; D34/26, 24

[56] References Cited

U.S. PATENT DOCUMENTS

| | | | |
|---|---|---|---|
| 3,041,026 | 6/1962 | Wilson | 280/47.24 |
| 3,116,936 | 1/1964 | Magarian | 280/47.24 |
| 3,306,624 | 2/1967 | Goss | 280/47.24 |

OTHER PUBLICATIONS

Quacker Industries Consort Rack Catalogue, Jul. 1970, Item No. 72T358 "Oak".

Primary Examiner—Joseph F. Peters, Jr.
Assistant Examiner—Joseph G. McCarthy
Attorney, Agent, or Firm—Trexler, Bushnell & Wolters, Ltd.

[57] ABSTRACT

A carriage assembly and a base therefor, are disclosed. The base comprises a pair of elongated feet, a bi-ended stiffening member and mounting means. The mounting means are located on each of the feet for mounting a portion of a leg of an upstanding, bi-legged frame member. Each foot defines a longitudinal axis between respective ends thereof. Each end of the stiffening member is carried by a respective foot to keep the longitudinal axis of one foot in parallel relation with the longitudinal axis of the other foot thereby providing the base with structural rigidity. Each foot includes respectively a wheel at one end thereof and a pad at an opposite end thereof. As to an individual foot, the wheel is aligned to provide the foot with mobility in the direction of its longitudinal axis, and each such mounting means is superimposed intermediate a certain pair of load-bearing regions of the foot thereby providing the base with stability.

6 Claims, 13 Drawing Figures

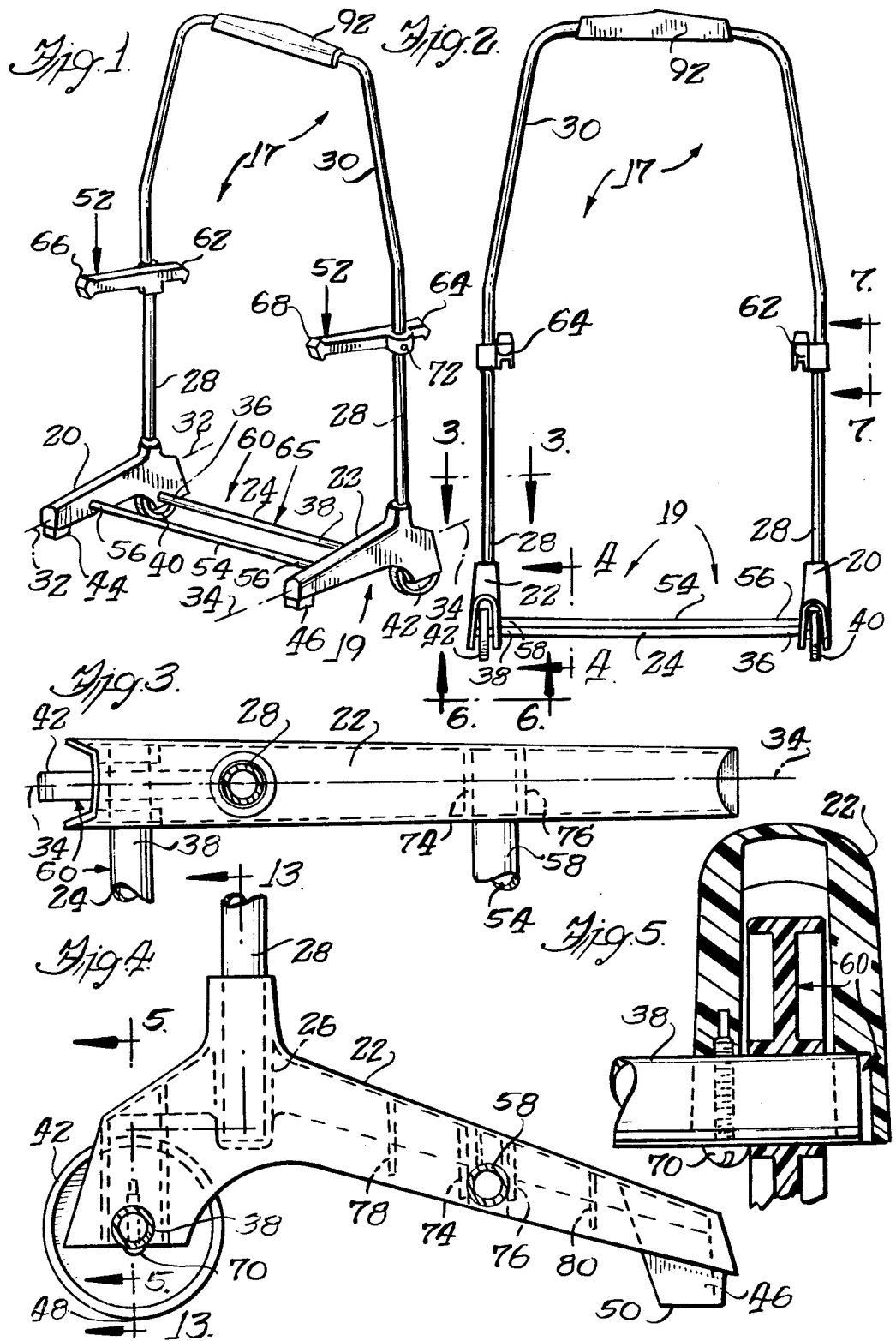

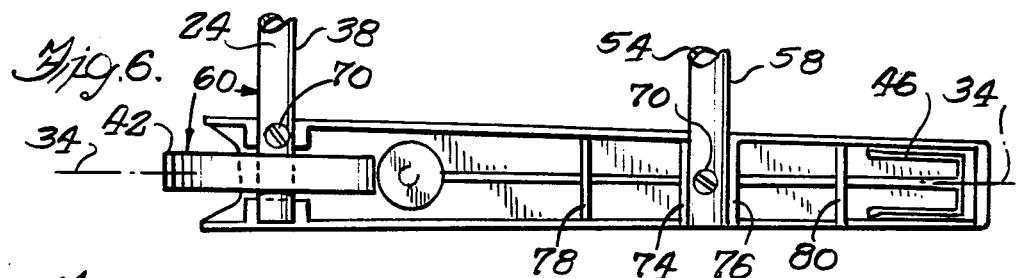
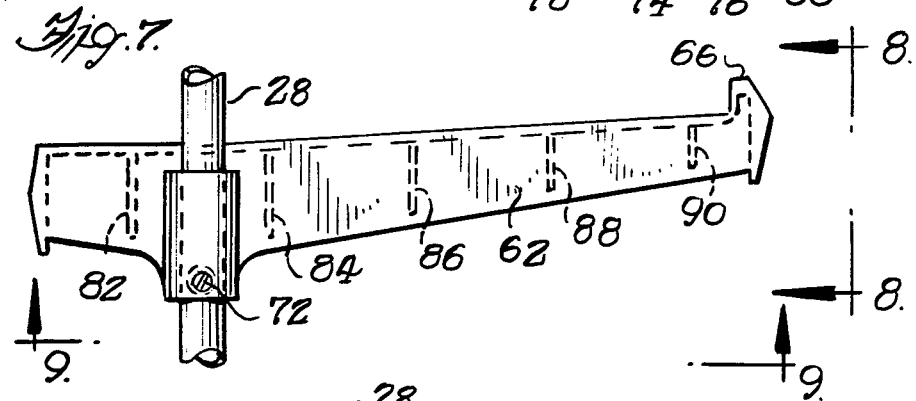
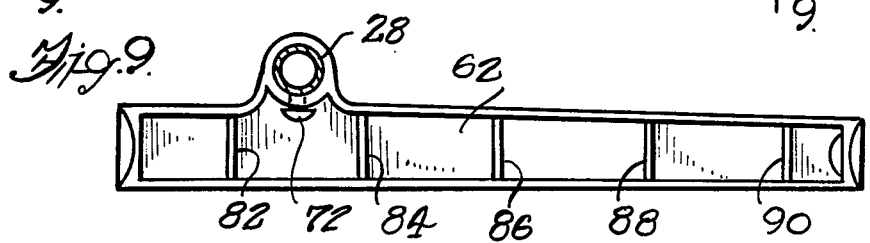
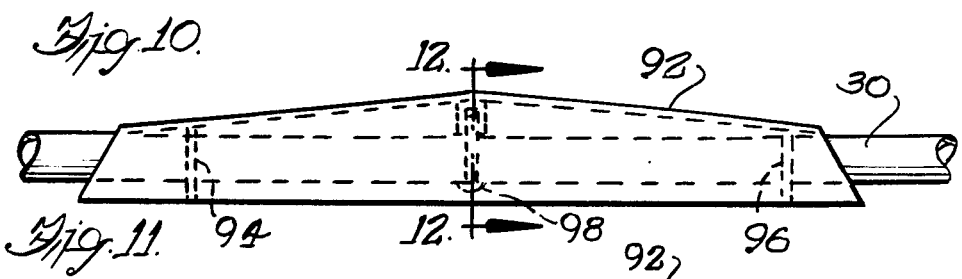
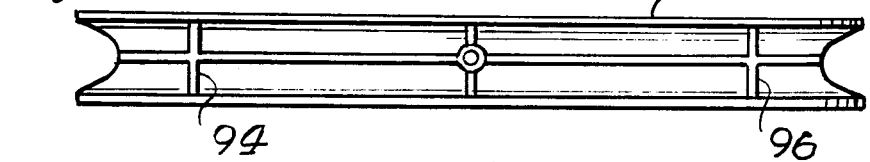
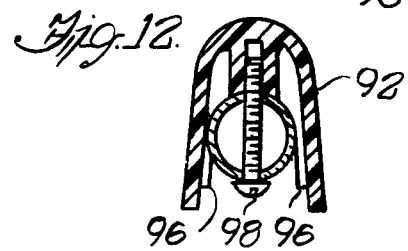

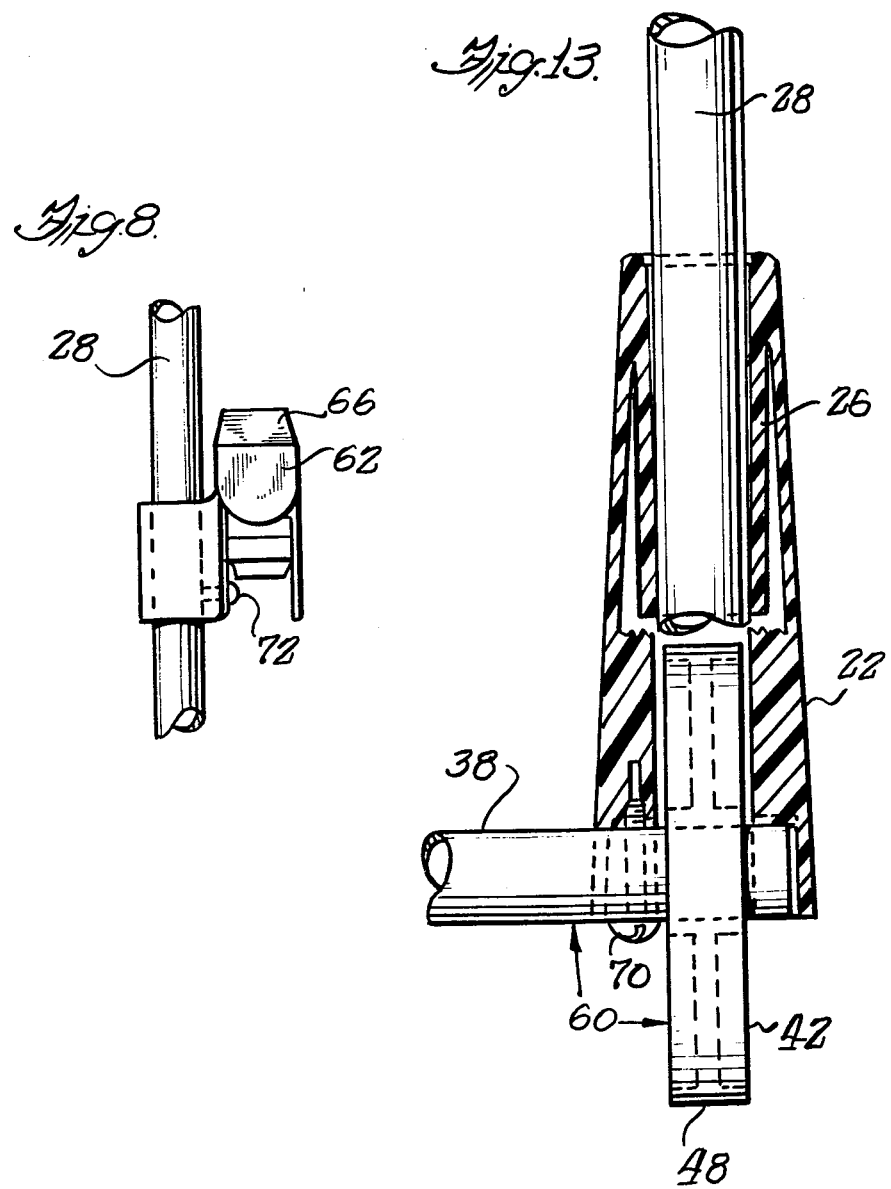

STABLE STRUCTURALLY RIGID, MOBILE CARRIAGE ASSEMBLY AND BASE THEREFOR

This application is a continuation of application Ser. No. 371,948 filed Apr. 26, 1982, now abandoned.

BACKGROUND OF THE INVENTION

This invention is directed to a novel carriage assembly and to a novel base therefor, and more particularly to a novel, stable, structurally rigid, mobile carriage assembly and a novel base therefor. While the invention is useful in many applications, the disclosure will be facilitated by specific reference to a carriage or storage assembly for collapsible or folding tray or snack tables.

Many storage or carriage assembly bases lack stability or structural rigidity.

Stability of a base is determined by a number of factors. One factor is the general shape and area of the geometric figure which is projected upon the ground—or other such surface upon which the base rests—by the load-bearing or surface-contact points of the base.

Structural rigidity of a base effects stability. The surface-contact points of the base are initially rigidly fixed in relation to each other so that a particular projected figure gives the base optimal stability. When a base lacks structural rigidity the geometry of the surface contact points move in a natural manner from these optimal initial positions. Accordingly, if the surface-contact points of the base move to where a line is the geometric figure which is projected upon the ground, the base is said to become critically unstable.

A second factor in considering stability of a base is the distribution or balance of a load between or upon such surface-contact points. Bases are usually designed to provide support in a substantially upright manner. A load which is concentrated at only one surface-contact point can cause such surface-contact point to sink into a soft surface, such as a rug, resulting in a deviation from the original upright position for that thing being supported by the base.

Improper consideration of either of these two factors can either result in the inherent instability of the base or a situation where the tipping of the thing, which is being carried upon the base, occurs.

Compactness of a base occasionally permits certain kinds of niches, which are normally found in walls, within foyers, or along hallways, to be used for the purpose of storing the base and the things carried thereupon.

Mobility of a base also tends to increase the storage feature of the base and the thing carried thereupon.

Unfortunately, certain of such storage or carriage assembly bases discussed above additionally lack compactness or mobility.

As a result of the foregoing shortcomings, many commercially available storage or carriage assemblies for folding or collapsible snack or tray tables become unavoidably imbalanced upon removal of one or more tray tables therefrom and resultingly tip over or fall. Additionally, certain other of these commercially available storage or carriage assemblies for tray tables either are not easily storable because they are too bulky, unwieldy or clumsy in design or are infrequently used because they lack means for achieving actual or effective mobility.

OBJECTS AND SUMMARY OF THE INVENTION

Accordingly, it is a general object of this invention to provide a novel and improved carriage assembly and base therefor for folding or collapsible snack or tray tables.

A more specific object is to provide such a base and a carriage assembly for tray tables which is stable and non-tippable.

Yet a still more specific object is to provide such a base and a carriage assembly which is additionally mobile.

A related object is to provide a base and a carriage assembly which exhibits compactness.

A further object is to provide a base and a carriage assembly which exhibits structural rigidity.

Yet another object is to provide a carriage assembly, including a base in accordance with the foregoing objects, which can be used to carry or move items, such as tray tables, and yet remain stable.

Briefly, and in accordance with the foregoing objects, a carriage assembly and a base therefor, are disclosed. The base comprises a pair of elongated feet, a bi-ended stiffening member and mounting means. The mounting means are located on each of the feet for mounting a portion of a leg of an upstanding, bi-legged frame member.

Each foot defines a longitudinal axis between respective ends thereof. Each end of the stiffening member is carried by a respective foot to keep the longitudinal axis of one foot in parallel relation with the longitudinal axis of the other foot thereby providing the base with structural rigidity. Each foot includes respectively a wheel at one end thereof and a pad at an opposite end thereof.

As to an individual foot, the wheel is aligned to provide the foot with mobility in the direction of its longitudinal axis, and each of the above-mentioned mounting means is superimposed intermediate a pair of load-bearing regions of the foot thereby providing the base with stability. The location of these load-bearing regions is herein defined to be where the pad and the wheel contact the ground when one side of the frame member is carrying a cantilevered load thereupon. A cantilevered load is herein defined as a load being supported by a horizontal member where such horizontal member is itself supported only at one end.

BRIEF DESCRIPTION OF THE DRAWINGS

The foregoing as well as other objects, features and advantages of the invention will become more readily understood upon reading the following detailed description of the illustrated embodiment, together with reference to the included drawings wherein:

FIG. 1 is a front perspective view of a side of the novel base and carriage assembly of the invention;

FIG. 2 is an elevational view of a back side of the novel base and carriage assembly of FIG. 1;

FIG. 3 is a top view of a foot and associated structure of the novel base taken substantially in the plane of the line 3—3 in FIG. 2;

FIG. 4 is a side view of that foot and associated structure of FIG. 3 taken substantially in the plane of the line 4—4 in FIG. 2;

FIG. 5 is a frontal view, paritally in section, further illustrating a portion of a wheel-and-axle assembly of the foot of FIG. 3 and taken substantially in the plane of the line 5—5 in FIG. 4;

FIG. 6 is a bottom view of the foot and associated structure of FIG. 3 taken substantially in the plane of the line 6—6 in FIG. 2;

FIG. 7 is a side view of an arm member of the base and carriage assembly of FIGS. 1 and 2 taken substantially in the plane of the line 7—7 in FIG. 2;

FIG. 8 is a full-frontal view of the arm of FIG. 7 taken substantially in the plane of the line 8—8 in FIG. 7;

FIG. 9 is a bottom view of the arm of FIG. 7 taken substantially in the plane of the line 9—9 in FIG. 7;

FIG. 10 is a front view of a hand grip element assembled with the carriage assembly of the invention;

FIG. 11 is a bottom view of the hand grip element of FIG. 10;

FIG. 12 is a sectional view of the hand grip element, the view taken substantially along the line 12—12 of FIG. 10; and FIG. 13 is a front view, in partial section of the foot, the view taken substantially along the line 13—13 in FIG. 4.

Throughout the drawings, like reference numerals refer to like parts.

DETAILED DESCRIPTION OF THE ILLUSTRATED EMBODIMENT

Referring now to the drawings and initially to FIGS. 1 and 2, a novel carriage assembly designated generally by the reference numeral 17 and a novel base therefor designated generally by the reference numeral 19, are illustrated. This novel base 19 comprises a pair of elongated feet 20, 22, at least one (or a first) bi-ended stiffening member 24 and mounting means 26, as best viewed in FIGS. 3, 4 and 13.

The mounting means 26 are located on each of the feet 20, 22 for mounting a portion of a leg 28 of an upstanding, bi-legged frame member 30. As illustrated in FIGS. 2, 4 and 13, the frame member 30 is oriented substantially vertically with respect to the base 19. The preferred mounting means 26 contemplates formation of an upwardly disposed cavity in each foot 20, 22 for snugly receiving therein each respective leg 28 of the frame member 30, as illustrated in FIGS. 1, 2, 3, 4 and 13.

Each foot 20, 22 defines a longitudinal axis 32, 34 between respective ends thereof; one such longitudinal axis 34 is illustrated in FIGS. 3 and 6. Each end 36, 38 of the first stiffening member 24 is affixed to a respective foot 20, 22 to keep the longitudinal axis 32 of one foot 20 in parallel relation with the longitudinal axis 34 of the other foot 22, thereby providing the base 19 with structural rigidity.

The first stiffening member 24 is preferably affixed to the opposing lateral faces of the feet 20, 22 at the lagging portions thereof, as illustrated in FIGS. 1, 3 and 4.

Each foot 20, 22 includes respectively a wheel 40, 42 at a first or lagging end thereof and a pad 44, 46 at an opposite or leading end thereof. As illustrated in FIGS. 1 and 4, each pad 44, 46 is integral with and depends from a respective foot 20, 22. One such foot 22, illustrating such a wheel 42 and pad 46 arrangement, is shown in FIGS. 4 and 6.

Directing attention to FIGS. 3 and 6, it can be seen that for an individual foot 22, the wheel 42 is aligned to provide the foot 22 with mobility in the direction of the longitudinal axis 34 of that foot 22.

It can be appreciated, by referring to FIG. 4 and upon considering the case for an individual foot 22, that since the mounting means 26 is superimposed intermediate a pair of load-bearing regions 48, 50 of that foot 22, the base 19 is thus provided with stability. Advantageously, the load-bearing regions 48 of the wheels 40, 42 and the load-bearing regions 50 of the pads 44, 46, thus, respectively cooperate to support the base 19 of the carriage assembly 17 upon the ground.

The location of these load-bearing regions 48, 50 is defined to be where the pads 44, 46 and the wheels 40, 42 contact the ground when one side of the frame member 30 is carrying a cantilevered load thereupon. A cantilevered load, referred to generally by the numeral 52 is defined as a load being supported by a horizontal member where such horizontal member is itself supported only at one end. Such a cantilevered load 52 is illustrated in FIG. 1.

Viewing FIGS. 1 and 4 collectively, these load-bearing regions 48, 50 of each foot 20, 22 are seen to be so located thereat and so separated from each other such that the geometric shape which is being projected upon the ground is either a trapezoid (United States definition) having legs of equal length or a rectangle (because four of such load-bearing regions are involved), thereby providing the base 19 with superior stability. The preferred projected shape is that of a rectangle.

Turning to FIGS. 1, 2, 3 and 6, the preferred base 19 will be seen to include a second stiffening member 54. The second stiffening member 54 is affixed to the opposing lateral faces of the feet 20, 22. The ends 56, 58 of the second stiffening member 54 will be seen to be affixed to each respective foot 20, 22 at or near leading end portions thereof, thereby providing the base 19 with surprising structural rigidity. The combination of the first and second stiffening members 24, 54 thus advantageously cooperates to provide the feet 20, 22, and more particularly the base 19, with surprising and superior structural rigidity.

Directing attention to FIGS. 1, 3, 5, 6 and 13, the illustrated embodiment of the invention will be seen to include, as an added feature, a wheel-and-axle assembly, referred to generally by the numeral 60. The preferred wheel-and-axle assembly 60 comprises a combined axle-and-stiffening member 24 and a pair of wheels 40, 42. Each wheel 40, 42 is located at a respective end 36, 38 of the combined axle-and-stiffening member 24. Advantageously, each respective end 36, 38 of this combined axle-and-stiffening member 24 is affixed to the foot 20, 22 along opposing lateral faces of the feet 20, 22 and at a rear or trailing end portion thereof.

In accordance with a feature of the invention, each foot 20, 22 thus mounts a respective end 36, 38 of the wheel-and-axle assembly 60 at a trailing end portion thereof. The wheels 40, 42 of the axle-and-stiffening member 24, accordingly, carry a respective foot 20, 22.

In accordance with another feature of the invention, each leg 28 of the frame member 30 respectively carries a vertically adjustable arm 62, 64. Each arm of this pair of arms 62, 64 extends horizontally away from the respective leg 28 and rises upwardly, to a slight degree as it so extends, as illustrated in FIG. 7. In accordance with yet another feature of the invention, the leg 28 of the frame member 30 carries the arm 62, 64 at a rear or trailing portion thereof, as illustrated in FIGS. 1, 7 and 9.

As illustrated in the preferred embodiment of FIG. 4, the location of the mounting means 26 proximate to this combined axle-and-stiffening member 24 greatly enhances mobility of the invention. When the carriage assembly 17 is fully loaded (such as with a plurality of tray tables) and resting upon a soft surface, such as a rug, it is contemplated first, that a restraining force 65 (illustrated in FIG. 1) be imposed upon this combined axle-and-stiffening member 24; then, that the upstanding frame member 30 be drawn horizontally toward the back side of the invention, thus causing the load-bearing regions 50 of the pads 44, 46 to leave the ground. Accordingly, the arms 62, 64 remain loaded, and the invention can be pulled and thus moved easily without the tray tables falling off.

The preferred arm 62, 64 is made of a substance suitably stiff and sufficiently strong so that a load 52 (such as would be expected when the arms 62, 64 support a plurality of tray tables) does not cause the arms 62, 64 to deflect substantially or to fail. The arm 62, 64, illustrated in FIGS. 1, 7 and 9, thus, is a cantilevered support member; and the preferred arm can support 4, 5 or 6 foldable or collapsible commercially available snack or tray tables.

Each arm 62, 64 has located at a distal, respective end thereof, one of a pair of upwardly extending fingers 66, 68. In accordance with still another feature of the invention, each arm 62, 64 is of a length sufficient to carry snugly a predetermined number of folded snack or tray tables between a respective leg 28 and finger 66, 68.

The invention thus contemplates that these tray tables will be asymmetrically carried by the carriage assembly 17, and additionally that such tray tables will be non-uniformly supported by the base 19. Accordingly, such considerations cooperate with the above-described features of the base 19 to inherently enhance the stability of the invention. Moreover, when the invention is placed against a wall in a manner such that the arms 62, 64 extend outwardly, the asymmetric manner of carrying the load 52 permits relatively free access to the individual tray tables.

The arms 62, 64 extend from the legs 28 of the frame member 30 in the same directional sense as do the feet 20, 22. From the legs 28 of the frame member 30, the arms 62, 64 extend no farther than do the distal load-bearing regions 50 of the feet 20, 22. As illustrated in FIG. 4, these load-bearing regions 50 are located along the underside of the pads 44, 46.

FIGS. 1 and 2 illustrate that each arm 62, 64 is carried by a respective leg 28 of the frame member 30 above a respective foot 20, 22. The distal end of each arm 62, 64 extends from its respective leg 28 of the frame member 30 less than does the respective pad 44, 46 located therebelow.

As illustrated in FIG. 4, the legs 28 of the frame member 30 are preferably located proximate to the load-bearing regions 48 of the wheels 40, 42. However, it can be appreciated from FIG. 4, that the foot 20, 22 can equivalently carry the leg 28 of the frame member 30 proximate to the load-bearing regions 50 of the pads 44, 46. For such a case, the wheels 40, 42 would be distally related to the respective legs 28 of the frame member 30. Each arm 62, 64, thus would then extend horizontally away from its respective leg 28 of the frame member 20, in the same directional sense as its respective foot 20, 22 located therebelow. But more importantly in such a case, the load-bearing regions 48 of the wheels 40, 44 would extend farther from each respective leg 28 of the frame member 30, than would the distal end of a respective arm 62, 64 carried thereabove.

As best viewed in FIG. 7, the arms 62, 64 are as long as is necessary to carry a plurality of tray tables snugly between the leg 28 of the frame member 30 and the finger 66 of the arm 62. As an added tray table-retaining feature, the arm 62, 64 rises slightly, in a horizontal manner, as illustrated in FIG. 7, as this arm 62 extends outwardly from the leg 28 of the frame member 30. For this arm 62, such a consideration, of course, depends upon the design of and the thickness of the individual folded or collapsed tray or snack tables, and upon the number of such tables to be supported by the arms 62, 64. Although such tray tables are not shown in the drawings, it can be appreciated that the length of the arms 62, 64 may be varied to receive as many as four, five or even six such tray tables.

In accordance with a feature of the invention, to assure stability with an overhung load on the arms 62, 64, the feet 20, 22 of the base 19 extend outwardly from the mounting means 26 portions, each of which carry a respective leg 28 of the frame member 30. To maintain the compactness feature of the base 19 and of the carriage assembly 17, such extension of the feet 20, 22 is only slightly beyond the extension of the respective arms 62, 64 located there-above, as illustrated in FIG. 1. Consequently, the shape of the geometric figure projected upon the ground by nature of the design of the base 19, the structural rigidity of the base 19 by nature of incorporation therein of at least two stiffening members 24, 54 and the asymmetric manner of carrying the load-supporting arms 62, 64 (substantially as discussed above) advantageously cooperate to provide the carriage assembly 17 with surprising stability, whether the arms 62, 64 are supporting an overhung load in a normal fashion, or are supporting such an overhung load at a distal end of the arms 62, 64 or are supporting no load at all.

Accordingly, the features of the invention advantageously cooperate to provide the carriage assembly 17 with a non-tippable quality.

As illustrated in FIG. 1, the frame member 30 is thus a load-supporting member, and the carriage assembly 17 is thus a load-carrying assembly.

Additionally, since the arms 62, 64 are adjustable vertically along the respective legs 28 of the frame member 30, the carriage assembly 17 can advantageously be used for stable storage and/or movement of other suitably foldable items of furniture, such as folding chairs.

A number of structural features of the illustrated embodiment will next be described. Securement of the ends 36, 38 and 56, 58 of the first and second stiffening members 24 and 54 to the respective feet 20, 22 of the base 19 contemplates use of suitable fastening devices, such as threaded fasteners 70, as illustrated in FIGS. 4, 5, 6 and 13.

A preferred structural arrangement for securing the arms 62, 64 to the respective legs 28 of the frame member 30 contemplates the use of a removable fastener, such as a bolt 72. As illustrated in FIGS. 1, 7, 8 and 9, this removable bolt 72 provides adjustable vertical engagement of each arm 62, 64 along its respective leg 28 of the frame member 30.

For purposes of further securing the second stiffening member 54, each respective foot 20, 22 of the illustrated embodiment includes a pair of guiding members 74, 76, as illustrated in FIGS. 3, 4 and 6. These guiding members 74, 76 snugly secure and incorporate the ends 56, 58 of the second stiffening member 54 into each respective foot 20, 22 thus enhancing the structural rigidity of the base 19.

As an added stability feature, as best viewed in FIG. 13, the bottom of each respective foot 20, 22 is preferably broader than is the top thereof.

Furthermore, as illustrated in FIGS. 4 and 6, each respective foot 20, 22 advantageously incorporates a pair of ribs 78, 80 integrally formed therewith, thereby providing its respective foot 20, 22 with structural support and lateral rigidity. Similarly, as best viewed in FIGS. 7 and 9, the respective arm members 62, 64 incorporate a plurality of ribs 82, 84, 86, 88 and 90 for structural support and lateral rigidity.

In the illustrated embodiment, as best viewed in FIGS. 1 and 2, the bi-legged frame member 30 carries a hand grip 92. This hand grip 92 serves to increase the surface area and thereby to provide better handling and control at the region where the bi-legged frame member 30 is most often held. Inviting attention to the hand grip 92 itself, as illustrated in FIGS. 10, 11 and 12, this hand grip 92 incorporates a pair of ribs 94, 96 for structural rigidity. The illustrated embodiment additionally contemplates use of a fastening device, such as a threaded fastener 98, to secure the hand grip 92 to the bi-legged frame member 30.

In the preferred embodiment, the feet 20, 22 and the hand grip 92 are manufactured from a high-impact variety of polystyrene polymer, and the arms 62, 64 are manufactured from a medium-impact variety of polystyrene polymer.

What has been illustrated and described herein is a novel base and carriage assembly. While the invention has been illustrated and described with reference to a preferred embodiment, the invention is not limited thereto. On the contrary, alternatives, changes or modifications may become apparent to those skilled in the art upon reading the foregoing description.

Accordingly, such alternatives, changes and modifications are to be considered as forming a part of the invention insofar as they fall within the scope and spirit of the appended claims.

I claim:

1. A structurally rigid, stable and mobile load-carrying assembly including a base, and a one-piece, upstanding, bi-legged, load-supporting frame member having a pair of legs, said frame member including support means for supporting a cantilevered load, said base comprising: a pair of elongate feet, each foot comprising a plastic resin material and having a pair of spaced sidewalls, each foot defining a longitudinal axis between respective ends thereof and including respectively a rotatable wheel disposed within one end thereof between said sidewalls and a pad at an opposite end thereof extending between said sidewalls, said wheel of each said respective foot being aligned within said respective foot relative to the other wheel in the other foot so as to provide said feet with mobility substantially in the direction of the longitudinal axes thereof; a stiffening member comprising an axle having spaced opposite ends, each end of said stiffening member being carried by a respective one of said feet to keep said longitudinal axis of one of said feet in fixed relation with said longitudinal axis of the other of said feet, said axle being supported by both sidewalls of each foot and rotatably carrying said wheels; mounting means formed within each one of said feet and mounting therein an end portion of a respective one of said pair of legs of said frame member, each respective one of said mounting means forming a cavity between said sidewalls superimposed intermediate a spaced pair of load-bearing regions of said respective foot for snugly receiving a respective one of said pair of leg end portions, location of said respective load-bearing regions being defined to be where said pad and said wheel of each said foot contact the ground when said frame member is supporting said cantilevered load; and said support means including a pair of substantially parallel, load-supporting arms, each one of said arms respectively being vertically, releasably positionable along a respective one of said legs, each one of said arms extending substantially horizontally from said respective leg and slightly upwardly relative to said respective foot for retaining said cantilevered load proximate to said frame member, each one of said arms further including a finger oriented upwardly and located at an end of said arm in distal relation to said frame member, whereupon said feet, stiffening member and mounting means co-act whereby to provide said base and said load-carrying assembly with structural rigidity, stability and mobility when said load is carried by said arms.

2. The load-carrying assembly and load-supporting frame member of claim 1 including a second stiffening member parallel to said first stiffening member carried by said feet at opposing sidewalls thereof, the ends of said second stiffening member being affixed to each respective one of said feet adjacent both sidewalls thereof in distal relation to the first stiffening member thereby providing said base and said load-carrying assembly with structural rigidity.

3. A load-carrying assembly and load-supporting frame as set forth in claim 2 and further including a plurality of transverse stiffening webs extending between the sidewalls of each foot, a pair of said webs being spaced so as to embrace a respective end of said second stiffening member to support said second stiffening member in rigid relation to said feet.

4. A load-carrying assembly as set forth in claim 1 wherein each foot is longitudinally arched from adjacent the respective load-bearing regions up to a position adjacent the respective leg mounting cavity.

5. A load-carrying assembly as set forth in claim 1 wherein said support means have extensions projecting beyond said legs oppositely of said arms.

6. The load-carrying assembly and load-supporting frame member of claim 1 wherein each one of said arms extends horizontally almost as far from each said respective leg of said frame member as does each one of said respective feet thereby providing said load-carrying assembly and said load-supporting frame member with compactness.

* * * * *